United States Patent
Posa et al.

(10) Patent No.: US 9,661,232 B2
(45) Date of Patent: May 23, 2017

(54) APPARATUS AND METHOD PROVIDING AUTO ZOOM IN RESPONSE TO RELATIVE MOVEMENT OF TARGET SUBJECT MATTER

(76) Inventors: John G. Posa, Ann Arbor, MI (US); Benjamin E. Posa, Ann Arbor, MI (US)

(*) Notice: Subject to any disclaimer, the term of this patent is extended or adjusted under 35 U.S.C. 154(b) by 979 days.

(21) Appl. No.: 13/209,025

(22) Filed: Aug. 12, 2011

(65) Prior Publication Data
US 2012/0038796 A1     Feb. 16, 2012

Related U.S. Application Data

(60) Provisional application No. 61/373,044, filed on Aug. 12, 2010.

(51) Int. Cl.
H04N 5/232     (2006.01)

(52) U.S. Cl.
CPC ..... H04N 5/23296 (2013.01); H04N 5/23216 (2013.01)

(58) Field of Classification Search
CPC ............... H04N 5/23296; H04N 5/23216
USPC ............ 348/170, 208.6, 240.1, 240.2, 240.3, 348/208.3, 208.14, 240.99
See application file for complete search history.

(56) References Cited

U.S. PATENT DOCUMENTS

| | | | |
|---|---|---|---|
| 5,355,163 A | 10/1994 | Tomitaka | |
| 5,559,551 A | 9/1996 | Sakamoto et al. | |
| 5,570,177 A * | 10/1996 | Parker et al. | 356/139.06 |
| 5,574,498 A | 11/1996 | Sakamoto et al. | |
| 5,812,193 A | 9/1998 | Tomitaka et al. | |
| 6,115,067 A | 9/2000 | Koyama | |
| 6,172,706 B1 | 1/2001 | Tatsumi | |
| 6,298,170 B1 | 10/2001 | Morita et al. | |
| 6,507,366 B1 | 1/2003 | Lee | |
| 6,876,387 B1 * | 4/2005 | Lee | 348/240.2 |
| 7,248,286 B2 | 7/2007 | Cho | |
| 7,248,294 B2 * | 7/2007 | Slatter | 348/240.99 |
| 7,720,369 B2 | 5/2010 | Nose | |

(Continued)

FOREIGN PATENT DOCUMENTS

JP     05346958 A     * 12/1993
JP     06217187 A     * 8/1994

(Continued)

*Primary Examiner* — John Villecco
(74) *Attorney, Agent, or Firm* — John G. Posa; Belzer PC (57) ABSTRACT

Methods and apparatus enable an image-viewing system to automatically zoom in and out as target subset matter is tracked. A hand-held body with a lens gathers an image including target subject matter. An image sensor having a resolution in pixels receives the image, and a viewfinder displays at least a portion of the image received by the image sensor. By virtue of the invention, apparatus for automatically zooming out the image displayed in the viewfinder if relative movement is detected between the target subject matter and the body and, and automatically zooming in the image displayed in the viewfinder if the relative movement of the target subject matter slows down or becomes stationary. A power zoom lens may effectuate the automatic zooming, or the zooming may be accomplished digitally without moving parts. The body may form part of a camera, video recorder, binoculars or telescope.

11 Claims, 6 Drawing Sheets

(56) References Cited

U.S. PATENT DOCUMENTS

| | | | |
|---|---|---|---|
| 8,421,887 B2* | 4/2013 | Yokohata | 348/240.1 |
| 2003/0035051 A1* | 2/2003 | Cho et al. | 348/169 |
| 2004/0062434 A1* | 4/2004 | Tsuyuki | G06T 5/50 |
| | | | 382/154 |
| 2004/0257648 A1* | 12/2004 | Mogamiya | G02B 23/18 |
| | | | 359/407 |
| 2005/0007662 A1* | 1/2005 | Mogamiya | G02B 23/12 |
| | | | 359/407 |
| 2005/0062870 A1* | 3/2005 | Sato | G02B 23/18 |
| | | | 348/335 |
| 2005/0074185 A1* | 4/2005 | Jung et al. | 382/298 |
| 2006/0050982 A1* | 3/2006 | Grosvenor | 382/255 |
| 2006/0174297 A1* | 8/2006 | Anderson, Jr. | G02B 27/017 |
| | | | 725/100 |
| 2008/0143854 A1* | 6/2008 | Steinberg et al. | 348/239 |
| 2008/0199049 A1* | 8/2008 | Daly | 382/107 |
| 2010/0149353 A1* | 6/2010 | Jang et al. | 348/208.12 |
| 2010/0271494 A1* | 10/2010 | Miyasako | 348/208.1 |
| 2011/0025902 A1* | 2/2011 | Miroshnichenko | G02B 23/14 |
| | | | 348/335 |
| 2012/0223969 A1* | 9/2012 | Schoeller | G06K 9/00664 |
| | | | 345/633 |
| 2012/0257284 A1* | 10/2012 | Okamoto | G02B 7/004 |
| | | | 359/630 |
| 2013/0100262 A1* | 4/2013 | Reymond | H04N 7/002 |
| | | | 348/61 |
| 2013/0176463 A1* | 7/2013 | Hyvarinen | 348/240.99 |
| 2016/0073039 A1* | 3/2016 | Lee | H04N 5/2628 |
| | | | 348/333.12 |

FOREIGN PATENT DOCUMENTS

| | | | |
|---|---|---|---|
| JP | 10188145 A | * | 7/1998 |
| JP | 2000347275 A | * | 12/2000 |
| JP | 2004354794 A | * | 12/2004 |
| JP | 2006115525 A | * | 4/2006 |
| JP | 2007228492 A | * | 9/2007 |
| JP | 2009033450 A | * | 2/2009 |

* cited by examiner

APPARATUS AND METHOD PROVIDING AUTO ZOOM IN RESPONSE TO RELATIVE MOVEMENT OF TARGET SUBJECT MATTER

REFERENCE TO RELATED APPLICATION

This application claims priority from U.S. Provisional Patent Application Ser. No. 61/373,044, filed Aug. 12, 2010, the entire content of which is incorporated herein by reference.

FIELD OF THE INVENTION

This invention relates generally to still and video-image gathering and, in particular, to apparatus and methods providing automatic zoom functions in conjunction with pan or tilt actions.

BACKGROUND OF THE INVENTION

There are situations wherein the user of image-gathering apparatus wishes to zoom in on stationary subject matter, then zoom out if the subject matter moves to maintain tracking of an object. As one example, bird watchers may wish to use maximum magnification for a resting bird, zoom out to follow the bird to a new perch, then zoom in again. Another example is sports, wherein a viewer may wish to zoom in during the snap of a football then zoom out when the ball is thrown. While a user may perform these zoom-in/zoom-out functions manually, automation would allow the user to concentrate on subject matter as opposed to equipment settings.

SUMMARY OF THE INVENTION

This invention resides in methods and apparatus that enable an image-viewing system to automatically zoom in and out as target subset matter is tracked. A system according to the invention comprises a hand-held body with a lens to gather an image including target subject matter. An image sensor having a resolution in pixels receives the image, and a viewfinder displays at least a portion of the image received by the image sensor. By virtue of the invention, apparatus for automatically zooming out the image displayed in the viewfinder if relative movement is detected between the target subject matter and the body and, and automatically zooming in the image displayed in the viewfinder if the relative movement of the target subject matter slows down or becomes stationary.

The system may further include a plurality of display buffers storing versions of the image gathered over time, so that the relative movement of the target subject matter may be detected by comparing changes the images stored in display buffers. The system may also include auto-focus and/or image recognition hardware or software to detect the relative movement or assist in detecting the relative movement. The system may further include an accelerometer or tilt sensor to detect or assist in detecting the relative movement. A power zoom lens may effectuate the automatic zooming, or the zooming may be accomplished digitally without moving parts. The body may form part of a camera, video recorder, binoculars or telescope, and a memory may be included for recording the gathered image.

A digital embodiment of the invention includes an image sensor having a resolution in pixels for receiving the image with a viewfinder for displaying at least a portion of the image received by the image sensor. A processor is operative to digitally zoom in by utilizing a subset of the image sensor pixels to gather the image, thereby magnifying a portion of the image displayed in the viewfinder. The system in this case automatically digitally zooms out if relative movement is detected between the body and the target subject matter, and automatically digitally zooms in if the subject matter slows down or becomes stationary relative to the movement of the body. As with other embodiments, the hand-held body may form part of a camera, video recorder, binoculars or telescope.

DETAILED DESCRIPTION OF THE INVENTION

Figure 1A:
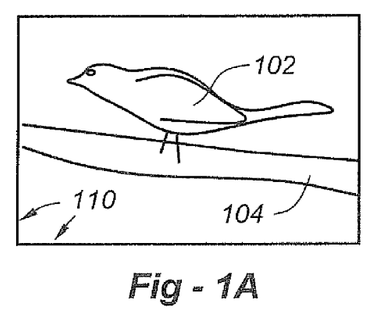
FIGS. 1A-1H illustrate the way in which the invention operates.
Figure 1B:
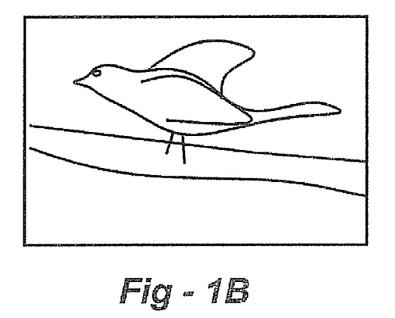
Figure 1C:
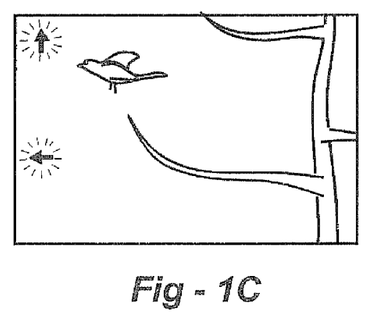
Figure 1D:
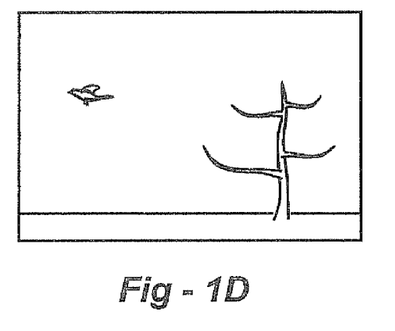
Figure 1E:
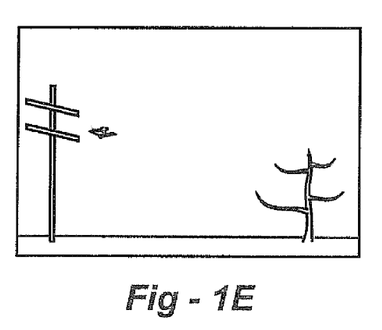
Figure 1F:
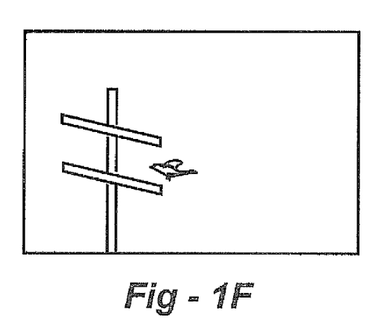
Figure 1G:
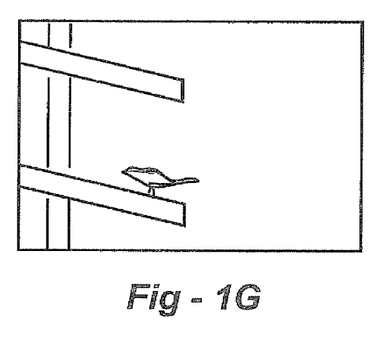
Figure 1H:
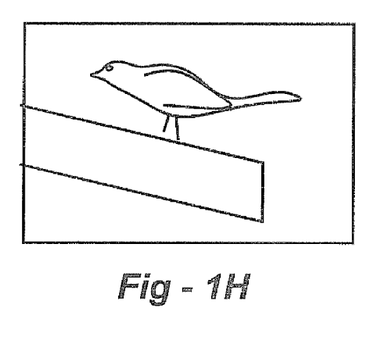

FIGS. 1A through 1H illustrate the way in which the invention operates. In FIG. 1A, a user is viewing a relatively stationary object, in this example a bird 102 on a branch 104. Reference 110 designates the field of view of the apparatus, which may be a still camera, a video camera, a telescope, binoculars or any other device used to track an object that stops and goes, whether or not the image is recorded. In FIG. 1B, the bird is beginning to take flight, and in FIG. 1C the bird leaves the branch. In accordance with the invention, at some point the apparatus automatically zooms out, enabling the user to see a wider field of view and follow the target. In FIGS. 1D and 1E, the apparatus automatically zooms out further. In FIG. 1F, as the bird finds a new perch and slows down, the apparatus may automatically zoom back in. If the bird remains stationary, the apparatus may continue to zoom in to a maximum desired extent for the highest magnification.

In FIGS. 1A-1H, the subject matter being tracked, in this case the bird 102, is not in the center of the field of view but it may be centered depending upon the embodiment and operator control. Different embodiments will now be described in detail.

Figure 2:
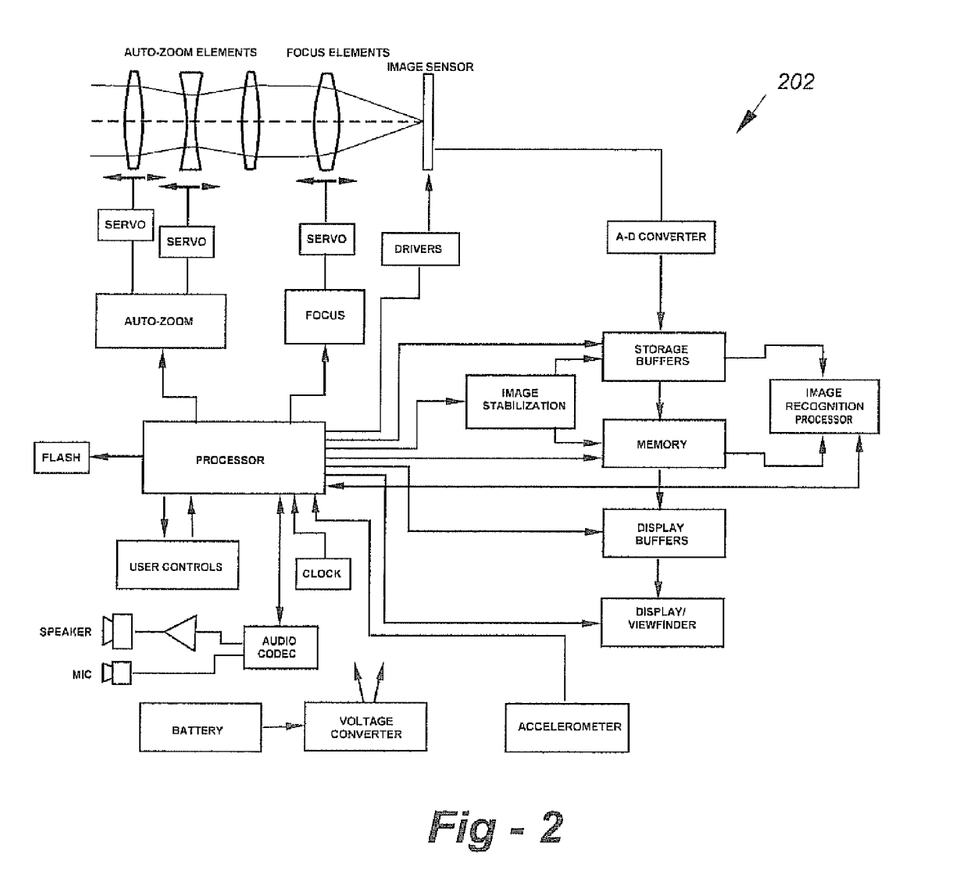
FIG. 2 shows a representative block diagram of apparatus according to the invention.

FIG. 2 is a representative block diagram of apparatus according to the invention. The diagram may represent a camera or video recorder with the understanding that different modules may be included or excluded depending upon the applications and/or desired capabilities. The diagram would be applicable to different apparatus with appropriate modification; for example, with recording binoculars two lenses would be used. With three-dimensional recording apparatus two lenses and image sensors might be used, and so forth.

In FIG. 2, an image is formed onto the image sensor through lens assembly 202. The lens assembly uses auto-zoom elements moved by one or more servos or other mechanisms. The lens typically further includes one or more elements for auto focusing using any known or yet to be developed technology. The gathered image is converted as necessary, buffered and stored if the apparatus is a recording apparatus. For playback or view-finding, the image frame(s) buffered and displayed on a screen coupled or attached to the apparatus.

Having identified target subject matter in a relatively static field of view, the inventive apparatus can determine if the target begins to move within or leave the field of view, in which case the apparatus automatically zooms out if such capability is user enabled. Not only should the auto zoom-out/-in function be under user control, the operator may preferably also set or adjust maximum zoom in, maximum zoom out and the rate of zoom relative to the movement of the subject matter in accordance with the invention.

Continuing the reference to FIG. 2, the apparatus may optionally include image stabilization circuitry or software to reduce hand-held jitter, particularly at higher levels of magnification. It is assumed that if such stabilization circuitry is present it works on concert with the image recognition and auto zoom-in/-out capability. More particularly, while the image stabilization circuitry recognizes when an entire scene 'jiggles' relative to the image plane, the target recognition circuitry will remain capable of detecting whether the target subject matter moves apart from the scene overall. The invention also functions in conjunction with auto-focusing, in which case the auto focus may be programmed or controlled to focus on the subject matter being tracked.

Figure 3A:
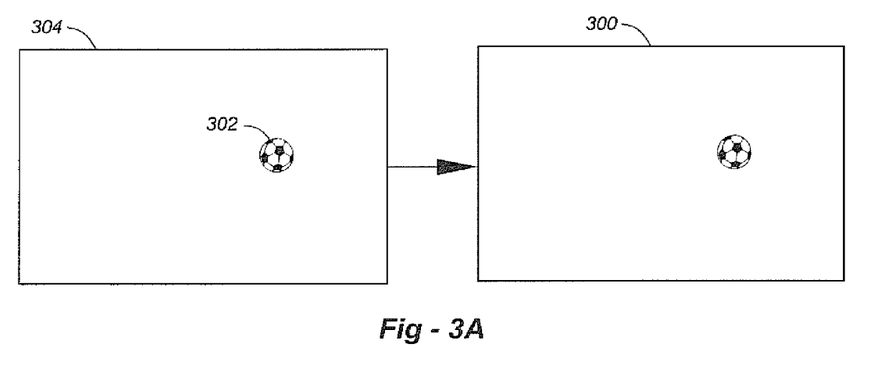
FIGS. 3A-3D illustrate the way in which an all-digital embodiment of the invention might operate.

In the event that the image sensor has sufficient pixels, the invention may rely upon digital zoom without moving parts. FIGS. 3A-3D illustrate the way in which an all-digital preferred embodiment of the invention might operate. The rectangles labeled 304 represent the pixels of the image sensor, whereas rectangle 300 represents the image seen through a viewfinder (and/or output to a transmission or recording device). In FIG. 3A it is assumed that the object, in this case a soccer ball 302, has been moving but has just come to rest. The apparatus has automatically digitally zoomed out due to the movement, such that most or all of the pixels of the image sensor are being used and the resolution of the image in the viewfinder corresponds to that gathered by the image sensor.

Figure 3B:
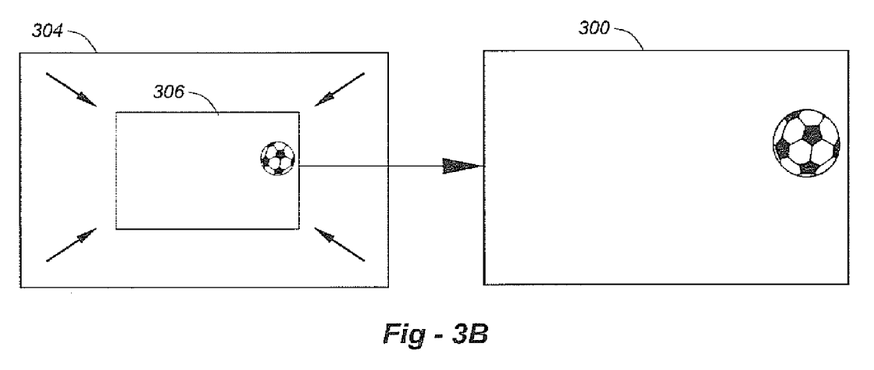
Figure 3C:
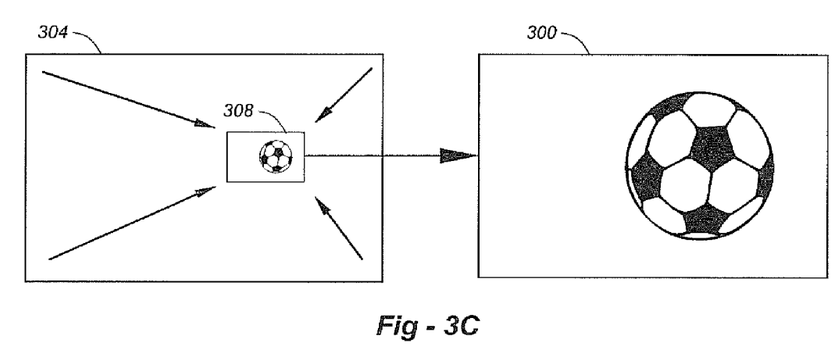
Figure 3D:
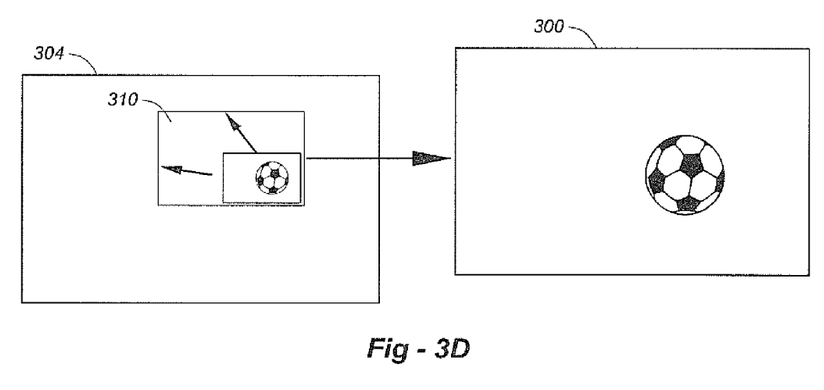

Again, it is assumed that the object has just ceased moving. In FIG. 3B, the apparatus begins to automatically zoom in, thereby now using a subset of the 306 of the total number of pixels, thereby effectuating a digital zoom function. The image to the right in viewfinder 300 is therefore magnified. The process continues in FIG. 3C, with yet a higher degree of magnification as the user continues to view the object as it continues to remain at least relatively stationary. Fewer pixels of the image sensor 304 are used, and the scene in viewfinder 300 is more magnified. In FIG. 3D, however, the object has begun to move upwardly and to the left, and the user has begun to pan tilt in that direction. The actions of the user and/or the movement of the object is sensed in accordance with the invention, and an auto zoom-out function begins to occur, as shown in the right of FIG. 3D. To aid the user in tracking the subject matter, one or more arrows may be displayed as shown in FIG. 1C, informing the user in terms of the relative movement of the target.

Any number of image-processing technologies may be used in conjunction with the invention to carry out the zoom-in (or zoom-out) function. For example, comparisons may be made to a large portion or the entire image gathered by the image sensor over time to determine that pan/tilt movement by the user has slowed or stop, signaling the desire to zoom in. In the case of a video camera, changes based upon frame rate may be used.

If the apparatus includes image stabilization technology, relatively small changes in pan/tilt movements that would be indicative of "jiggling" would not trigger the automatic zoom function. Rather, the system would make intelligent decisions regarding user movements to distinguish between inadvertent motion and actual pan/tilt functions so that image stabilization and auto zoom could be used together, assuming both are user-enabled.

The same is true of autofocus functions. In addition to frame-frame comparisons, an autofocussing capability may be used together or separately to provide better interpretations of user intent and object tracking. For example, if a user slows down side-side and/or up-down movements and remains auto focused on a central object, it may be assumed with a higher degree of certainty that this is what the user wishes to see, thereby initiating zoom-in. Decisions may also be made automatically regarding whether or not to center the object being tracked during zoom-in/-out, depending upon the process implemented. For example, in FIG. 3B, note that the object has not been automatically centered. Particularly with auto-focus (or object recognition discussed below), the object may be optionally be automatically centered by the system, or the user may pan/tilt to center the object with such action being interpreted as centering as opposed to the need for further auto-zoom functions.

Figure 4A:
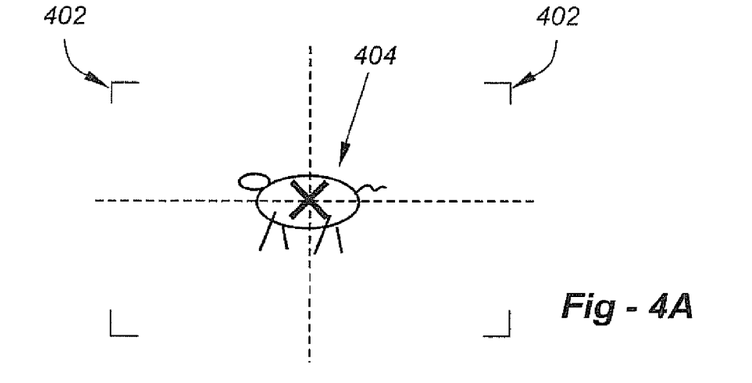
FIG. 4A shows a viewfinder of a camera, telescope, binoculars or other optical instrument.
Figure 4B:
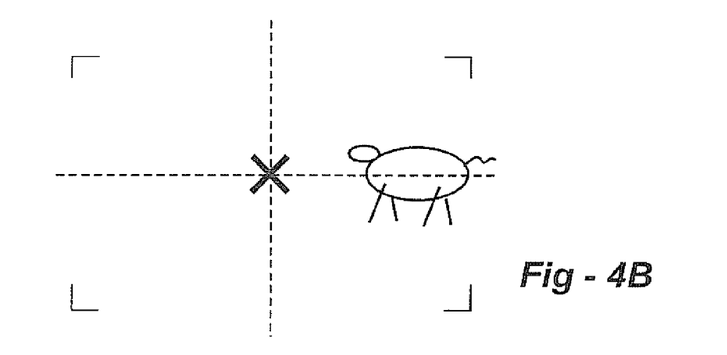
FIG. 4B shows what the system will do if the subject falls outside the central (X) area.
Figure 4C:
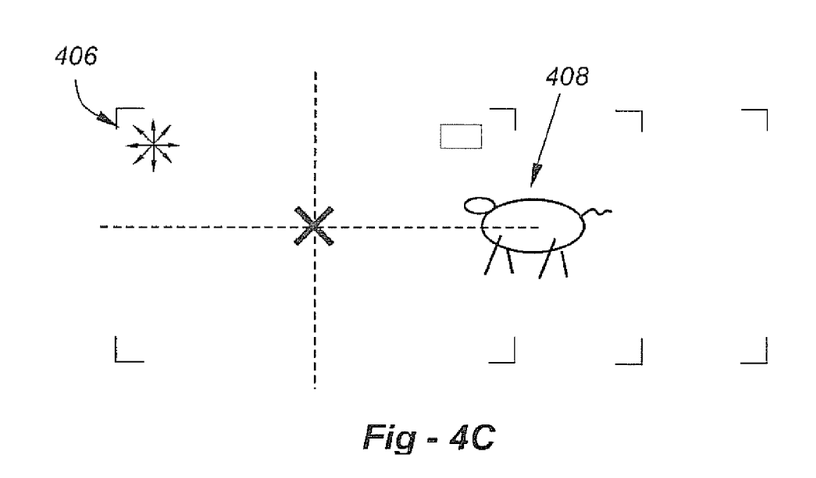
FIG. 4C shows that an icon such a multi-headed arrow may be used, with one or more of the arrows lighting up or blinking.

With a sufficiently large image sensor, the auto-zoom functions may be governed more by automatic object tracking than by user movements. Indeed, in some embodiments the invention is not limited to zooming out when a subject moves or zooming in when a subject is at rest. FIG. 4A shows a viewfinder of a camera, telescope, binoculars or other optical instrument at 402. A subject 404 is being viewed at or near the center of the viewfinder, as shown with the (X) identifier in the picture. According to this aspect of the invention, if the (X) continues to be superimposed over the subject, the zoom will be maintained at a particular level, such as maximum zoom, for example. According to this embodiment of the invention, however, even if the target moves, if the user continues to keep the (X) over or close to the subject, the zoom will be maintained. If the subject falls outside the central (X) area, as shown in FIG. 4B, the system will zoom out in an attempt to keep the subject in the viewfinder overall. If the user again moves the (X) over the subject, zoom will again increase. As shown in FIG. 4C, an icon such a multi-headed arrow 406 may be used, with one or more of the arrows lighting up or blinking to assist the user in finding the subject 408. Since both the subject and the viewing apparatus may be moving, a combination of image recognition and/or movement detection technologies may be used.

As with the other embodiments disclosed herein, the embodiment of FIGS. 4A-4C works well with auto-focus in the sense that the subject matter in focus in some cases may also be the target to be tracked, thereby simplifying or confirming image recognition. This is particularly true with long lenses following a subject with a shallow depth of field. In such cases the foreground and background may be out of focus which the subject being followed is in focus, thereby simplifying the object tracking process.

As a further option, an image-recognition processor, which may form part of the central processor unit, may be used in conjunction with specialized software to identify subject matter in the field of view, much like currently available face-recognition capabilities. Any technique may be used to recognize the target subject matter including comparisons with stored templates involving size, shape or color.

In alternative embodiments of the invention the apparatus may detect direct, physical movement of the camera or other apparatus as opposed to or in addition to scene changes or target identification. Referring back to FIG. 2, one or more accelerometers and/or tilt sensors may be provided to detect movement of the apparatus by the user. In such cases, when the subject matter viewed by the user begins to move outside the current field of view, movement of the camera or other device incorporating the invention is detected by the accelerometers and/or tilt sensors, causing the lens to zoom out in response to movement and zoom back in when the apparatus again becomes stabilized. While 3-axis sensors may be used, since there is virtually no movement along the axis of the lens, 2-axis sensors may suffice. Indeed, for some applications with little or no tilting, a single-axis accelerometer may be used to sense right-left movement alone.

We claim:

1. An image-viewing system, comprising:
a body with a lens to gather an image including target subject matter;
an image sensor having a resolution in pixels for receiving the image;
a viewfinder for displaying at least a portion of the image received by the image sensor;
a processor operative to digitally zoom in by utilizing a subject of the image sensor pixels to gather the image, thereby magnifying a portion of the image displayed in the viewfinder;
apparatus for automatically digitally zooming out the image displayed in the viewfinder if relative movement is detected between the body and the target subject matter, and automatically digitally zooming in the image displayed in the viewfinder if the relative movement between the subject matter and the body slows down or stops;
wherein the rate of zoom relative to the movement of the subject matter is user adjustable; and
wherein the apparatus is operative to automatically zoom out or zoom in, regardless of the position of the target subject matter in the viewfinder, in response to movement of the target subject matter relative to the body, movement of the body relative to the target subject matter, or movement of both the target subject matter and body sufficient to cause relative movement therebetween.

2. The image-viewing system of claim 1, further including:
a plurality of display buffers storing versions of the image gathered over time; and
wherein the relative movement is detected by comparing changes in the images stored in the display buffers.

3. The image-viewing system of claim 1, further including auto-focus apparatus to detect the relative movement.

4. The image-viewing system of claim 1, further including image recognition apparatus to detect the relative movement.

5. The image-viewing system of claim 1, further including an accelerometer or tilt sensor to detect the relative movement.

6. The image-viewing system of claim 1, further including a memory for recording the image.

7. The image-viewing system of claim 1, wherein the body forms part of a camera, video recorder, binoculars or telescope.

8. The image-viewing system of claim 1, wherein maximum level of zoom-in, zoom-out, or both, are user adjustable.

9. The image-viewing system of claim 1, wherein the body is a hand-held body.

10. The image-viewing system of claim 1, further including image stabilization apparatus; and
wherein movements of the body indicative of jiggling do not trigger the automatic zoom-out or zoom-in functions.

11. The image-viewing system of claim 1, wherein the rate at which the apparatus zooms in or zooms out is proportional to the degree of the relative movement.

* * * * *